L. G. SABATHÉ.
INTERNAL COMBUSTION ENGINE AND METHOD OF OPERATING THE SAME.
APPLICATION FILED JUNE 10, 1908.
975,640.
Patented Nov. 15, 1910.
2 SHEETS—SHEET 1.
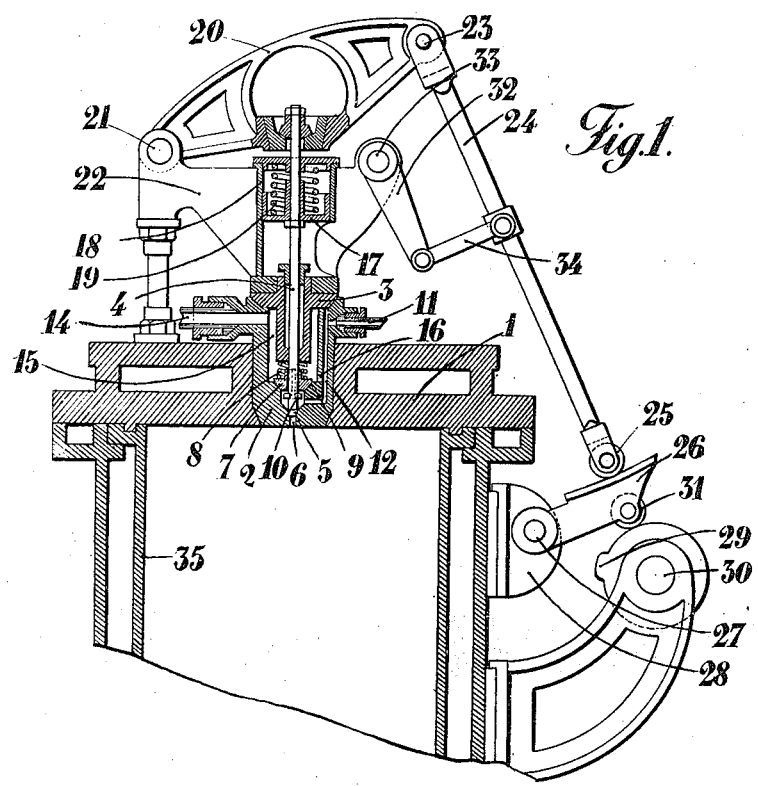

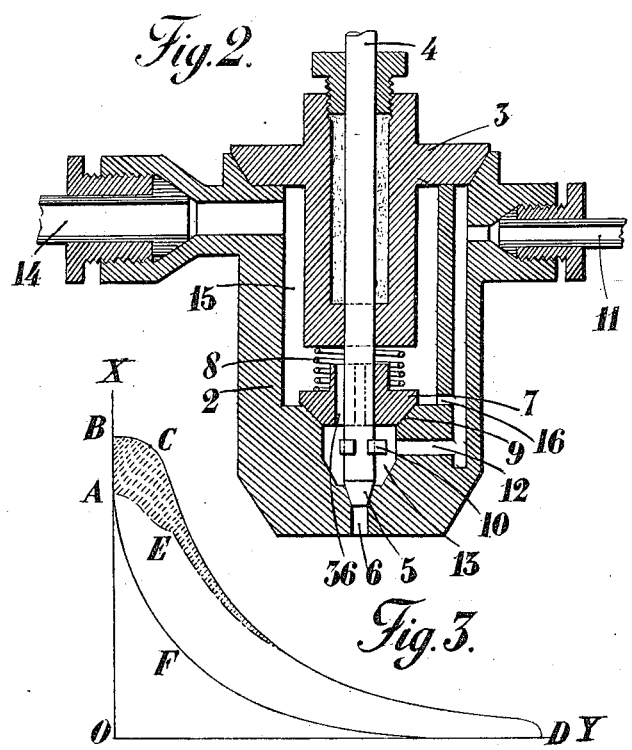

UNITED STATES PATENT OFFICE.

LOUIS GASTON SABATHÉ, OF PARIS, FRANCE, ASSIGNOR TO THE SOCIETE DES MOTEURS SABATHE, OF SAINT-ETIENNE, LOIRE, FRANCE, A CORPORATION OF FRANCE.

INTERNAL-COMBUSTION ENGINE AND METHOD OF OPERATING THE SAME.

975,640. Specification of Letters Patent. Patented Nov. 15, 1910.

Application filed June 10, 1908. Serial No. 437,651.

*To all whom it may concern:*

Be it known that I, LOUIS GASTON SABATHÉ, citizen of the French Republic, residing at Paris, Department of the Seine, in France, have invented certain new and Useful Improvements in Internal-Combustion Engines and Methods of Operating the Same, of which the following is a specification.

This invention relates to the construction and operation of internal combustion engines in which air, or other gas capable of supporting combustion, is introduced into a solid, liquid or gaseous, fuel in a finely divided state, and wherein combustion ensues spontaneously, or is brought about by well known means.

The present method of operating an internal combustion engine has the advantage that with the same degree of compression and the same consumption of fuel a higher maximum temperature is obtainable, and a more rapid combustion and a longer expansion than usual are produced, thus effecting a more complete combustion and a higher thermal efficiency. A greater degree of compression may also be obtained, since the combustion does not produce the same shocks due to instantaneous and maximum compressions as in common practice.

To these ends, the invention consists in a method of operating an internal combustion engine, which consists in admitting to the cylinder and igniting a fuel charge during the time that the piston is at or near the dead point and also when, on the same stroke of the piston, the latter moves away from the dead point and thereby increases the volume of the combustion chamber, and in admitting to the cylinder and igniting a second and additional fuel charge, simultaneously with the continuance of the first, when the volume of the combustion chamber is increased as indicated.

The invention also consists in an engine in which the above described method is carried out. In the preferred embodiment of the invention, the engine is provided with valves, one of which is operated to admit the fuel to be consumed while the volume is substantially constant, the other valve being operated subsequently, and preferably by means of the first mentioned valve, to act in conjunction with the first valve and thereby admit a larger amount of fuel to the cylinder when the volume of the combustion chamber increases owing to the stroke of the piston away from the dead point, in order that the pressure at this stage in the operation will be maintained substantially constant.

In the accompanying drawings—Figure 1 is a vertical section of a combustion engine constructed according to the present invention. Fig. 2 is a detail view of the inlet valves. Fig. 3 is a comparative diagram showing the results secured by the present invention as compared with prior results.

The cover or head 1 of the engine cylinder is furnished with a valve casing 2 wherein are arranged the inlet valves. This casing 2 is hollow and is closed at its upper end by a gland 3 through which a valve-rod 4 works. This rod is conical at its lower end 5, which forms a valve serving to open or close a passage 6 connecting the cylinder 35 and the casing 2. Slidably mounted upon the rod is a valve 7 controlled by a spring 8 which normally tends to hold the valve against its seat 9 while the rod 4 is furnished with lugs 10 so arranged as to lift the valve 7 at a certain point in the upward stroke of the rod.

The fuel under pressure is delivered to the valve casing in regulated quantities by a pipe 11 which communicates with the aperture 12 located in the wall of the valve casing and leading into a chamber 13 beneath the valve 7, while an opening 16 to the passage admits the fuel to another chamber 15 arranged above said valve 7.

The air under pressure is delivered to the valve casing by way of a pipe 14 which communicates with the chamber 15 above the valve 7, whence it passes downward with the fuel by way of channels 36 in the valve 7 to the chamber 13.

The valve rod 4 carries a piston 17 which works in a cylinder 18 carried on the valve casing 2. A spring 19 which is disposed between the top of the cylinder and the piston 17 tends normally to maintain the valve 5 on its seat. The upper end of the rod 4 is connected to a pivotally mounted lever 20 whereof the pivot 21 is carried by an arm 22 mounted upon the cylinder wherein the valve rod piston works, this arm being also supported by the head of the engine cylinder. A rod 24 is connected to the pivoted lever 20 which is connected at 23, the lower end of said rod carrying a roller 25 which, under the influence of the spring acting on the valve-rod piston, bears upon an arm 26 pivotally mounted at 27 upon a support 28 attached to the engine cylinder. This lever is furnished with a roller 31 which bears against a rotating cam 29 mounted on a shaft 30 driven from the engine shaft.

The variation of the length of stroke of the rod 24 linked to the pivoted lever 20 connected to the valve-rod 4, and consequently the lift of the valves in the valve casing, is obtained by moving the roller 25 longitudinally of the arm 26. By this movement of the roller toward or away from the pivot of the arm 26, the length of stroke of the valve rod and consequently the lifting of the valves in the valve casing, is diminished or increased, as will be understood. This adjusting movement of the roller is effected by a lever 32 pivotally mounted at 33 on the valve casing, and controlled by any suitable mechanical means, said lever being connected by a link 34 to the rod 24.

The variation in the lift of the valves is such that with a light load, the valve 7 in the upper chamber of the valve casing is not brought into operation, thus effecting an appreciable economy in the air or other gas employed for supporting combustion.

The operation of the mechanism is as follows: Under the action of the cam 29, the valve 5 is raised and the mass of fuel under pressure, contained in the chamber 13, finds entry to the cylinder by the passage 6. At this time, the piston is about to arrive at the dead point, the mass of gas is compressed, the volume remaining substantially constant, and the temperature increases considerably. That is the period of combustion with a constant volume, which obtains while the piston is at the dead point and while it moves slightly away from the same on reversing its movement. Then the rod 4 lifts up the valve 7 by means of the lugs 10. At this time the volume of the combustion chamber increases, owing to the down-stroke of the piston; the fuel which was retained by the valve 7 thus finds entry into the cylinder, both of the valves being open and acting coordinately in order to maintain the pressure substantially constant with an increasing volume. That is the second aspect of the combustion (combustion with constant pressure). After this the cam does not act, the valves close, the combustion ends, and the expansion takes place in the cylinder 35. The cross-hatched part of the diagram represented in Fig. 3 shows the advantage gained by the combustion process, O X being the axis of pressure and O Y the axis of volume. The diagram A E D F corresponds with the diagram of an ordinary motor with fuel injected at the dead point or immediately afterward. The dead point may be termed the stroke limit, which is that point where the piston stops and its reciprocal movement begins. The diagram A B C D F is that of a motor working with mixed combustion according to the invention. In this latter case the distance A B represents the growth of pressure and consequently of temperature at the dead point. This is the first stage of the operation: combustion at constant volume. The arc B C represents the growth of volume at substantially constant pressure, which constitutes the second stage of the cycle: combustion at constant pressure. The arc C D represents the expansion of gas in the cylinder.

What I claim is:

1. The method of operating an internal combustion engine, which consists in admitting to the cylinder and igniting a fuel charge during the time that the piston is at or near the dead point and also when, on the same stroke of the piston, the latter moves away from the dead point and thereby substantially increases the volume of the combustion chamber, and in admitting to the cylinder and igniting a second and additional fuel charge simultaneously with the continuance of the first charge when the volume of the combustion chamber is increased as indicated.

2. The method of operating an internal combustion engine, which consists in admitting to the cylinder and igniting a charge of fuel during the time that the piston approaches the dead point, while the piston is at the dead point and until the piston has moved slightly away from the dead point in the reciprocal direction, continuing the supply of fuel during the further movement of the piston at the same stroke, and, during such further movement of the piston, admitting to the cylinder and igniting simultaneously with the continuance of the first charge, an additional charge of fuel.

3. In an internal combustion engine, the combination with the cylinder, of means to admit fuel into the cylinder while the piston is near the dead point or stroke limit, and other means to admit a further charge of fuel into the cylinder during the time that the piston moves away from the dead point and thereby increases the volume of the combustion chamber.

4. In an internal combustion engine, the combination with the cylinder, of a valve to admit fuel into the cylinder during the time that the piston is near its dead point or stroke limit, and a valve to increase the fuel supply when the piston moves away from the dead point and substantially increases the volume of the combustion chamber.

5. In an internal combustion engine, successively acting valves to admit the fuel charge, one of such valves admitting fuel when the piston is near the dead point, and the other valve being opened and acting conjointly with the first to admit an increased charge of fuel when the piston moves away from the dead point.

6. In an internal combustion engine, the combination with the cylinder, of successively acting fuel admission valves, and means by which one of the valves is lifted by the other at a predetermined moment.

7. An internal combustion engine having a valve operated to admit fuel into the cylinder during the time that the piston is moving from a point near its stroke limit to its stroke limit and a short distance reciprocally away from its stroke limit, and a second valve for continuing the supply of fuel at an increased rate during a continuance of the movement of the piston in said reciprocal direction.

8. An internal combustion engine having a valve operated to admit fuel into the cylinder during the time that the piston is moving from a point near its stroke limit to its stroke limit and a short distance reciprocally away from its stroke limit, and a second valve for continuing the supply of fuel at an increased rate during a continuance of the movement of the piston in said reciprocal direction, the mechanism serving to effect a rate of flow of the fuel into the cylinder that will maintain a substantially uniform pressure in the cylinder during a portion of the reciprocal motion of the piston.

9. An internal combustion engine having a valve operated to admit fuel into the cylinder during the time that the piston is moving from a point near its stroke limit to its stroke limit and a short distance reciprocally away from its stroke limit, and a second valve for continuing the supply of fuel at an increased rate during a continuance of the movement of the piston in said reciprocal direction, said valves having a common stem.

10. An internal combustion engine having a valve operated to admit fuel into the cylinder during the time that the piston is moving from a point near its stroke limit to its stroke limit and a short distance reciprocally away from its stroke limit, and a second valve for continuing the supply of fuel at an increased rate during a continuance of the movement of the piston in said reciprocal direction, the mechanism serving to effect a rate of flow of the fuel into the cylinder that will maintain a substantially uniform pressure in the cylinder during a portion of the reciprocal motion of the piston, said valves having a common stem.

11. An internal combustion engine having a valve operated to admit fuel into the cylinder during the time that the piston is moving from a point near its stroke limit to its stroke limit and a short distance reciprocally away from its stroke limit, and a second valve for continuing the supply of fuel at an increased rate during a continuance of the movement of the piston in said reciprocal direction, the second valve being in sliding relation with respect to its stem, which stem constitutes the stem for the first valve, said stem having means for engaging the second valve to unseat the second valve when the first valve has been sufficiently moved away from its seat.

12. An internal combustion engine having a valve operated to admit fuel into the cylinder during the time that the piston is moving from a point near its stroke limit to its stroke limit and a short distance reciprocally away from its stroke limit, and a second valve for continuing the supply of fuel at an increased rate during a continuance of the movement of the piston in said reciprocal direction, the mechanism serving to effect a rate of flow of the fuel into the cylinder that will maintain a substantially uniform pressure in the cylinder during a portion of the reciprocal motion of the piston, the second valve being in sliding relation with respect to its stem, which stem constitutes the stem for the first valve, said stem having means for engaging the second valve to unseat the second valve when the first valve has been sufficiently moved away from its seat.

In testimony whereof I have hereunto set my hand in presence of two subscribing witnesses.

LOUIS GASTON SABATHÉ.

Witnesses:
H. PITONCIER,
T. BEMARIER.